(12) United States Patent
Yamada et al.

(10) Patent No.: US 10,054,729 B2
(45) Date of Patent: Aug. 21, 2018

(54) ILLUMINATION APPARATUS

(71) Applicant: TOYOTA BOSHOKU KABUSHIKI KAISHA, Kariya-shi, Aichi-ken (JP)

(72) Inventors: Takamasa Yamada, Nagoya (JP); Seiji Chaza, Nisshin (JP); Shingo Okahara, Nagoya (JP); Mitsutaka Sakoh, Nagakute (JP); Hideo Kanamori, Chiryu (JP); Atsuhiko Ito, Miyoshi (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/444,848

(22) Filed: Feb. 28, 2017

(65) Prior Publication Data
US 2017/0261670 A1 Sep. 14, 2017

(30) Foreign Application Priority Data
Mar. 9, 2016 (JP) .................................. 2016-046221

(51) Int. Cl.
| | |
|---|---|
| *F21V 8/00* | (2006.01) |
| *D03D 1/00* | (2006.01) |
| *D03D 25/00* | (2006.01) |
| *B60Q 3/54* | (2017.01) |
| *F21V 33/00* | (2006.01) |
| *F21W 131/301* | (2006.01) |
| *B60Q 3/64* | (2017.01) |

(52) U.S. Cl.
CPC ........... *G02B 6/001* (2013.01); *D03D 1/0088* (2013.01); *D03D 25/00* (2013.01); *G02B 6/0008* (2013.01); *B60Q 3/54* (2017.02); *B60Q 3/64* (2017.02); *B60Q 2500/10* (2013.01); *F21V 33/0012* (2013.01); *F21W 2131/301* (2013.01)

(58) Field of Classification Search
CPC .... G02B 6/001; G02B 6/0008; D03D 1/0088; D03D 25/00; B60Q 3/54; B60Q 3/64; B60Q 2500/10; F21V 33/0012; F21W 2131/301
See application file for complete search history.

(56) References Cited

U.S. PATENT DOCUMENTS

| | | | | |
|---|---|---|---|---|
| 5,709,448 A | * | 1/1998 | Jennings | G02B 6/001 362/156 |
| 5,894,686 A | * | 4/1999 | Parker | A43B 3/0021 36/137 |
| 6,628,885 B1 | * | 9/2003 | Wilkie | D02G 3/441 362/554 |

FOREIGN PATENT DOCUMENTS

JP 2010-267573 11/2010

* cited by examiner

*Primary Examiner* — Mary Ellen Bowman
(74) *Attorney, Agent, or Firm* — Greenblum & Bernstein, P.L.C.

(57) ABSTRACT

An illumination apparatus includes a woven fabric in which optical fibers are woven as a constituent yarn and a light source. The illumination apparatus makes light delivered from the light source incident upon the end surfaces on one end side of the optical fibers and emits the light at least from the end surfaces on the other end side of the optical fibers for illumination. The other end side of the optical fibers is exposed from the woven fabric to constitute exposed parts, and the end parts of a plurality of the exposed parts on the other end side are supported by an end part support to form emitting parts which emit light from the light source. On the end part support, the end parts of the exposed parts on the other end side are individually supported such that their respective end surfaces are aligned on the same plane.

20 Claims, 3 Drawing Sheets

ILLUMINATION APPARATUS

CROSS-REFERENCE TO RELATED APPLICATIONS

The present application claims priority under 35 U.S.C. § 119 of Japanese Application No. 2016-46221 filed on Mar. 9, 2016, the disclosure of which is expressly incorporated by reference herein in its entirety.

BACKGROUND

Technical Field

The present invention relates to an illumination apparatus. More specifically, the invention relates to an illumination apparatus which utilizes light emitted from the end parts of optical fibers used as a constituent yarn for a woven fabric.

Related Art

As an illumination apparatus utilizing optical fibers, there has conventionally been proposed an optical fiber illumination apparatus including a light source and an optical fiber woven fabric in which optical fibers are regularly woven between normal yarns at predetermined intervals, wherein, upon incidence of light into the optical fibers, the optical fiber woven fabric functions as an illumination apparatus (see JP 2910-267573 A).

SUMMARY

In fact, however, the conventional illumination apparatus described above has not utilized light propagated to the terminal ends of the optical fibers.

The present invention has been made in light of the actual situation, and an object thereof is to provide an illumination apparatus which utilizes light emitted from the end parts of optical fibers used as a constituent yarn for a woven fabric.

In order to solve this problem, a first aspect of the invention is directed to an illumination apparatus including a woven fabric in which optical fibers are woven as a constituent yarn and a light source, the illumination apparatus making light delivered from the light source incident upon the end surfaces on one end side of the optical fibers and emitting the light at least from the end surfaces on the other end side of the optical fibers for illumination, wherein the other end side of the optical fibers is exposed from the woven fabric to constitute exposed parts on the other end side;

wherein the end parts of the plurality of the exposed parts on the other end side are supported by an end part support to form emitting parts which emit light delivered from the light source; and wherein, on the end part support, the end parts of the plurality of the exposed parts on the other end side are individually supported in a state where their respective end surfaces are aligned on the same plane.

A second aspect of the invention is directed to the illumination apparatus according to the first aspect, wherein side-emitting optical fibers are used as the optical fibers.

A third aspect of the invention is directed to the illumination apparatus according to the first or second aspect, wherein the end parts of the plurality of the exposed parts on the other end side are allocated to and supported by a plurality of the end part supports.

A fourth aspect of the invention is directed to the illumination apparatus according to any one of the first to third aspects, wherein a plurality of groove parts are formed, along the length direction of the optical fibers, in the end part support/supports, and the end parts of the exposed parts on the other end side are engaged with and supported by the groove parts.

According to the illumination apparatus of the present invention, the light emitted from the end parts of the optical fibers can efficiently be utilized. Also, the light emitting parts can freely be disposed around the woven fabric by controlling the method of weaving the optical fibers, controlling the position and number of the light sources, or controlling the length of the exposed parts on the other end side for wiring, resulting in excellent degree of freedom in design. Further, it is possible to reduce the number of components for space saving and cost reduction. Additionally, the illuminating function can newly be imparted to articles in which a woven fabric is used.

Also, when side-emitting optical fibers are used as the optical fibers, light delivered from the light source can be emitted not only from the end surfaces of the exposed parts on the other end side, but also from the surface of the woven fabric in which the optical fibers are woven, thereby making it possible to further improve the designability and dressing effect.

Additionally, when the end parts of the plurality of the exposed parts on the other end side are allocated to and supported by a plurality of the end part supports, a plurality of light emitting parts can be provided, thereby making it possible to further improve the degree of freedom in design and designability. Further, it is possible to increase the number of the emitting parts without increasing the number of the light sources or to reduce the number of the light sources which have conventionally been required, leading to space saving and cost reduction.

In addition, when a plurality of groove parts are formed, along the length direction of the optical fibers, in the end part support, and the end parts of the exposed parts on the other end side are engaged with and supported by the groove parts, the state where their respective end surfaces are aligned on the same plane can be well maintained, so that the illuminating function can be exerted more stably.

DETAILED DESCRIPTION

Figure 1:
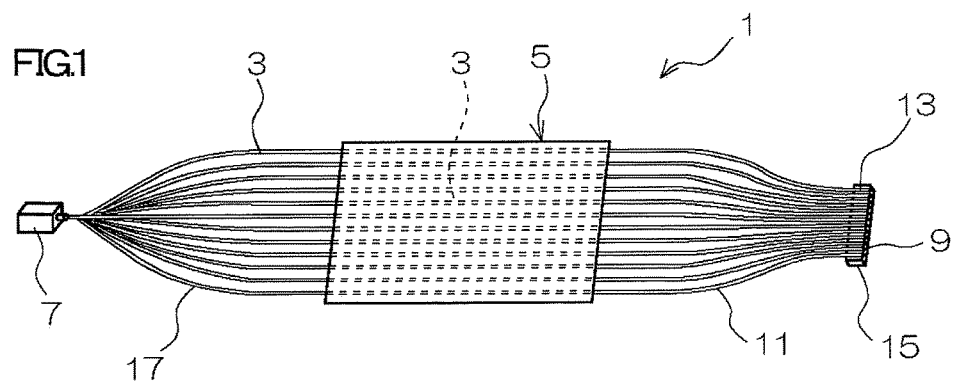
FIG. 1 is a schematic diagram for explaining an illumination apparatus.

The particulars shown herein are by way of example and for purposes of illustrative discussion of the embodiment of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, and the description is given with reference to the drawings in order to make apparent to those skilled in the art how the forms of the present invention may be embodied in practice.

The illumination apparatus according to the present embodiment is an illumination apparatus (1) including a woven fabric (5) in which optical fibers (3) are woven as a constituent yarn and a light source (7), the illumination apparatus making light delivered from the light source (7) incident upon the end surfaces on one end side of the optical fibers (3) and emitting the light at least from the end surfaces (9) on the other end side of the optical fibers (3) for illumination. Then, the other end side of the optical fibers (3) is exposed from the woven fabric (5) to constitute exposed parts (11) on the other end side, and the end parts (13) of a plurality of the exposed parts (11) on the other end side are supported by an end part support (15) to form emitting parts which emit light delivered from the light source (7). Additionally, on the end part support (15), the end parts (13) of the plurality of the exposed parts (11) on the other end side are individually supported in a state where their respective end surfaces (9) are aligned on the same plane (see FIGS. 1 and 3).

The above-described woven fabric (5) is a fabric woven of constituent yarns (warps and wefts), and the weave texture thereof is not particularly limited. Specifically, various weave textures of plain weave, twill weave, satin weave and the like can be employed.

At least the optical fibers (3) are used as a constituent yarn for the woven fabric (5).

As the optical fibers (3), there can be employed various optical fibers having a core-sheath structure (multilayer structure) of a core (core layer) and a sheath (clad layer) and also having different refractive indexes in the core layer and the clad layer. From the viewpoint of flexibility, excellent bending impact and the like, and easiness to weave, the optical fibers (3) are preferably made of a resin.

When the optical fibers (3) are made of a resin, for example, resins having excellent transparency including acrylic resins such as polymethyl methacrylate, polyethyl methacrylate and polyethyl acrylate, polycarbonate resins, polystyrene resins and polyolefin-based resins can be employed in the core layer. Further, resins having excellent transparency including vinylidene fluoride resins, vinylidene fluoride tetrafluroroethylene copolymer resins, polychlorotrifluoroethylene resins and trifluoroisopropyl methacrylate resins can be employed in the clad layer.

Additionally, the optical fibers (3) may be either edge-emitting optical fibers which emit the light coming from one end side from the other end side or side-emitting optical fibers which emit the light coming from one end side partly or entirely from their end surfaces and circumferential surfaces.

Especially, in a form where side-emitting optical fibers are used as the optical fibers (3), light delivered from the light source (7) can be emitted not only from the end surfaces (9) of the exposed parts (11) on the other end side, but also from the surface of the woven fabric (5) in which the optical fibers (3) are woven, thereby making it possible to further improve the designability and dressing effect.

The diameter of the optical fibers (3) is not particularly limited, but is preferably 0.25 mm to 3 mm, more preferably 0.1 mm to 1 mm from the viewpoint of weaving properties and general-purpose properties.

The optical fibers (3) are used as at least one of the warps and wefts constituting the woven fabric (5), and can be used especially as wefts.

When the optical fibers (3) are used as warps, the proportion of the optical fibers as the warps is preferably 10% or more and 90% or less, more preferably 20% or more and 80% or less, even more preferably 30% or more and 70% or less when the number of all the warps is defined as 100%.

Also, when the optical fibers (3) are used as wefts, the proportion of the optical fibers as the wefts is preferably 10% or more and 90% or less, more preferably 20% or more and 80% or less, even more preferably 30% or more and 70% or less when the number of all the wefts is defined as 100%.

The kinds of the constituent yarns (hereinafter referred to also as "other constituent yarns") constituting the woven fabric (5), other than the optical fibers (3), are not particularly limited, and those composed of plant-derived and animal-derived natural fibers, recycled fibers such as rayon, semi-synthetic fibers such as acetate, synthetic fibers made of synthetic resins, etc. can be employed.

Examples of the resins constituting synthetic fibers include polyamide-based resins such as nylon 6 and nylon 66, polyester-based resins such as polyethylene terephthalate, polybutylene terephthalate and polytrimethylene terephthalate, polyolefin-based resins such as high density polyethylene and polypropylene and polyacrylic resins.

Incidentally, in the other constituent yarns constituting the woven fabric (5), either the same yarn or different yarns may be used as warps and wefts. Additionally, the other constituent yarns used as the warps may be composed either of only one kind of yarns or two or more kinds of yarns in combination. Similarly, the other constituent yarns used as the wefts may be composed either of only one kind of yarns or two or more kinds of yarns in combination.

The fineness of the other constituent yarns is not particularly limited, but is preferably, for example, 100 dtex or more and 1000 dtex or less, more preferably 200 dtex or more and 700 dtex or less, even more preferably 300 dtex or more and 500 dtex or less.

The type of the above-described light source (7) is not particularly limited so long as the light source can make light incident upon one end side of the optical fibers (3). For example, LED can be employed.

Additionally, the number of the light sources (7) is not limited, and may be either one or two or more.

The arrangement of the light source (7) with respect to one end side of the optical fibers (3) is not particularly limited so long as light delivered from the light source (7) can be made incident upon their end surfaces on one end side. Specific examples of the arrangement can include a form in which one end side of the optical fibers (3) is exposed from the woven fabric (5) to constitute exposed parts (17) on one end side, the tip end parts of the plurality of the exposed parts (17) on one end side are bundled according to the number of the light sources (7), and the light source/sources (7) is/are arranged at a position opposite to the end surfaces of the tip end parts.

Additionally, in the illumination apparatus (1) according to this embodiment, the other end side of the optical fibers (3) constituting the woven fabric (5) is exposed from the woven fabric (5) to constitute exposed parts (11) on the other end side. The end parts (13) of the plurality of the exposed parts (11) on the other end side are supported by an end part support (15) to form emitting parts which emit light delivered from the light source. In the illumination apparatus (1), the light emitting parts can freely be disposed at a position distant from the woven fabric (5) by controlling the length of the exposed parts (11) on the other end side for wiring.

The above-described end part support (15) supports the end parts (13) of the plurality of the exposed parts (11) on the other end side individually, in a state where their respective end surfaces (9) are aligned on the same plane.

The configuration including the shape of the end part support (15) is not particularly limited so long as it can support the end parts (13), and the end part support (15) can be formed in various shapes including plate-like, columnar and other shapes according to the shape or the like of the installation site. Incidentally, this end part support (15) may normally have claw parts or groove parts for individually supporting the end parts (13) of the exposed parts (11) on the other end side at predetermined intervals.

Additionally, the material for the end part support (15) is not particularly limited, and can be, for example, a resin or metal.

Further, the number of the end part supports (15) is not particularly limited, and may be either one or two or more. When a plurality of end part supports (15) are provided, a plurality of light emitting parts can also be provided, thereby making it possible to further improve the freedom in design and designability. At this time, the end parts (13) of the plurality of the exposed parts (11) on the other end side are appropriately allocated and supported according to the number of the end part supports (15).

The method of aligning the respective end surfaces (9) of the exposed parts (11) on the other end side on the same plane in the end part support (15) is not particularly limited. For example, the end parts (13) of the exposed parts (11) on the other end side can be easily aligned on the same plane, for example, by cutting the optical fibers (3) using, as a cutting guide, the side end surface of the end part support (15) in a state where the end parts (13) of the exposed parts (11) on the other end side are individually supported. Also, there may be used an end part support provided with a cutting guide mechanism, such as a groove part, which indicates a cutting position. Incidentally, a part of the cutting guide mechanism may be cut along with the cutting of the optical fibers (3).

Figure 2:
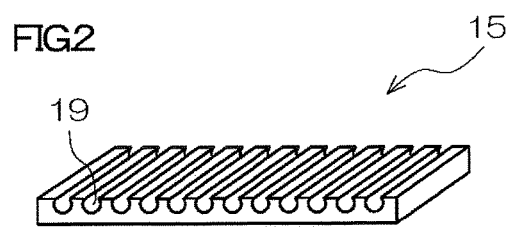
FIG. 2 is a schematic diagram for explaining an end part support.
Figure 3:
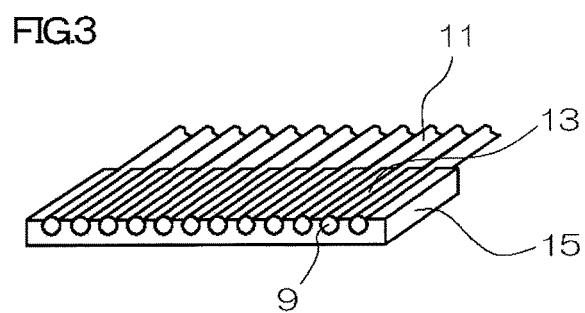
FIG. 3 is a schematic diagram for explaining a state where the end parts of optical fibers are supported by the end part support.

The illumination apparatus (1) according to this embodiment can encompass a form in which a plurality of groove parts (19) are formed, along the length direction of the optical fibers (3), in the end part support (15), and the end parts (13) of the exposed parts (11) on the other end side are engaged with and supported by the groove parts (19) (for example, see FIGS. 2 and 3).

In this form, the state where the respective end surfaces (9) of the exposed parts (11) on the other end side are aligned on the same plane can be well maintained in the end part support (15), so that the illuminating function can be exerted more stably.

Figure 4:
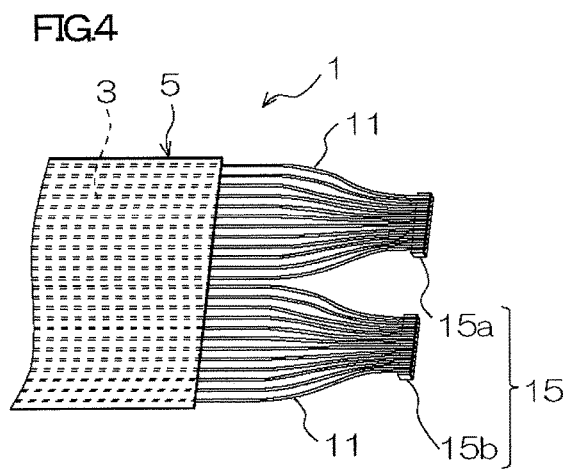
FIG. 4 is a schematic diagram showing an illumination apparatus including a plurality of end part supports.
Figure 5:
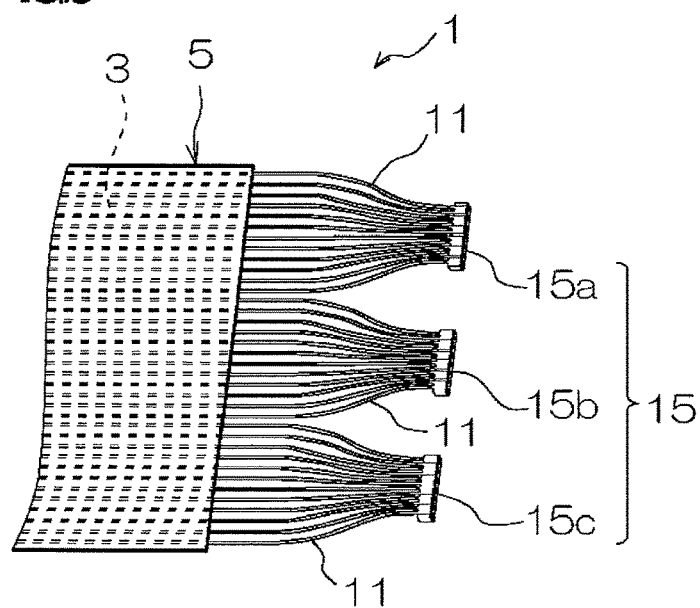
FIG. 5 is a schematic diagram showing an illumination apparatus including a plurality of end part supports.

Additionally, the illumination apparatus (1) according to this embodiment can encompass, for example, a form in which the end parts (13) of the plurality of the exposed parts (11) on the other end side are allocated to and supported by a plurality of the end part supports (15) (for example, see FIGS. 4 and 5).

In this form, a plurality of light emitting parts can be provided, thereby making it possible to further improve the freedom in design and designability. Further, it is possible to increase the number of the emitting parts without increasing the number of the light sources (7) or to reduce the number of the light sources (7) which have conventionally been required, leading to space saving and cost reduction.

Also, the illumination apparatus (1) according to this embodiment can suitably be utilized as a skin material for interior components for automobiles, railway vehicles and the like and furniture including sofas and chairs. Specifically, the woven fabric (5) in the illumination apparatus (1) can be utilized as a skin material for interior components for automobiles and the like (such as instrumental panels, door trims, roof trims, floor trims, luggage trims, trunk trims, rear side trims, rear parcel shelfs, package trays, peeler garnishes, switch bases, quarter panels, arm rests and sheets etc.) or a part thereof, and the end part support (15) on which the end parts (13) of the optical fibers (3) are supported can be utilized as a light source (light emission site) of illuminations (for example, inside handle lamps, courtesy lamps, vanity lamps, map lamps and dressing lamps etc.) on the periphery of the skin material.

Incidentally, parenthetic reference numerals following the features described in the above embodiment represent the correlation with the specific features described in the Examples which will be described below.

EXAMPLES

Hereinafter, the present invention will be described in detail by way of Examples with reference to the drawings.

Example 1

(1-1) Configuration of Illumination Apparatus

The illumination apparatus 1 of the present invention includes a woven fabric 5 and a light source 7 (LED light source), as shown in FIG. 1.

The woven fabric 5 is formed of warps [filaments made of polyester (not shown) and wefts [side-emitting optical fibers 3 and filaments made of polyester (not shown)].

One end side of the optical fibers 3 is exposed from the woven fabric 5 to constitute exposed parts 17 on one end side, and the tip ends of the plurality of exposed parts 17 on one end side are freely attachably/detachably coupled to the light source 7 in a state where the tip ends are bundled together.

The other end side of the optical fibers 3 is exposed from the woven fabric 5 to constitute exposed parts 11 on the other end side, and end parts 13 of the plurality of exposed parts 11 on the other end side are supported by an end part support 15.

As shown in FIGS. 2 and 3, the end part support 15 is formed in a plate-like shape in which a plurality of groove parts 19 are formed in parallel along the length direction of the optical fibers 3 at predetermined intervals. Then, the end parts 13 of the plurality of exposed parts 11 on the other end side are individually engaged with the groove parts 19. At this time, the respective end surfaces 9 of the exposed parts 11 on the other end side are supported in a state where they are aligned on the same plane, and constitute emitting parts which emit light from the light source 7.

(1-2) Action and Effect of Illumination Apparatus

In the illumination apparatus 1 of Example 1, light is made incident from the light source 7 onto the end surfaces on one end side of the optical fibers 3, so that light is emitted from the end surfaces 9 on the other end side of the optical fibers 3, whereby the illuminating function is exerted at a position distant from the light source 7. Further, since side-emitting optical fibers are used as the optical fibers 3, light can be emitted also from the surface of the woven fabric 5. Therefore, high designability and excellent dressing effect can be exerted.

Additionally, the end parts 13 of the exposed parts 11 on the other end side are securely engaged with and supported by the groove parts 19 formed in the end part support 15. Therefore, the state where the respective end surfaces 9 are aligned on the same plane can be well maintained, thereby making it possible to exert stable illuminating function.

Further, in this illumination apparatus 1, the light emitting part can freely be disposed around the woven fabric 5 via the woven fabric 5 by controlling the method of weaving the optical fibers 3 in the woven fabric 5, controlling the position and number of the light sources 7, or controlling the length of the exposed parts 11 on the other end side for wiring, resulting in excellent degree of freedom when the claimed illumination apparatus 1 is arranged.

Also, in this illumination apparatus 1, as shown in FIGS. 4 and 5, the end parts 13 of the plurality of exposed parts 11 on the other end side in the optical fibers 3 are divided into a plurality of groups, and are supported by a plurality of end part supports 15 (FIG. 4; 15*a*, 15*b* and FIG. 5; 15*a*, 15*b*, 15*c*), whereby a plurality of emitting parts can also be provided with respect to one light source 7. In such a form, the freedom in design and designability can further be improved, leading to space saving and cost reduction.

Example 2

As Example 2, there will be described an example in which the illumination apparatus 1 of Example 1 given above [note that this illumination apparatus 1 includes two end part supports 15 (see FIG. 4)] is applied to a door trim for automobiles (see FIG. 6).

(2-1) Configuration of Door Trim

Figure 6:
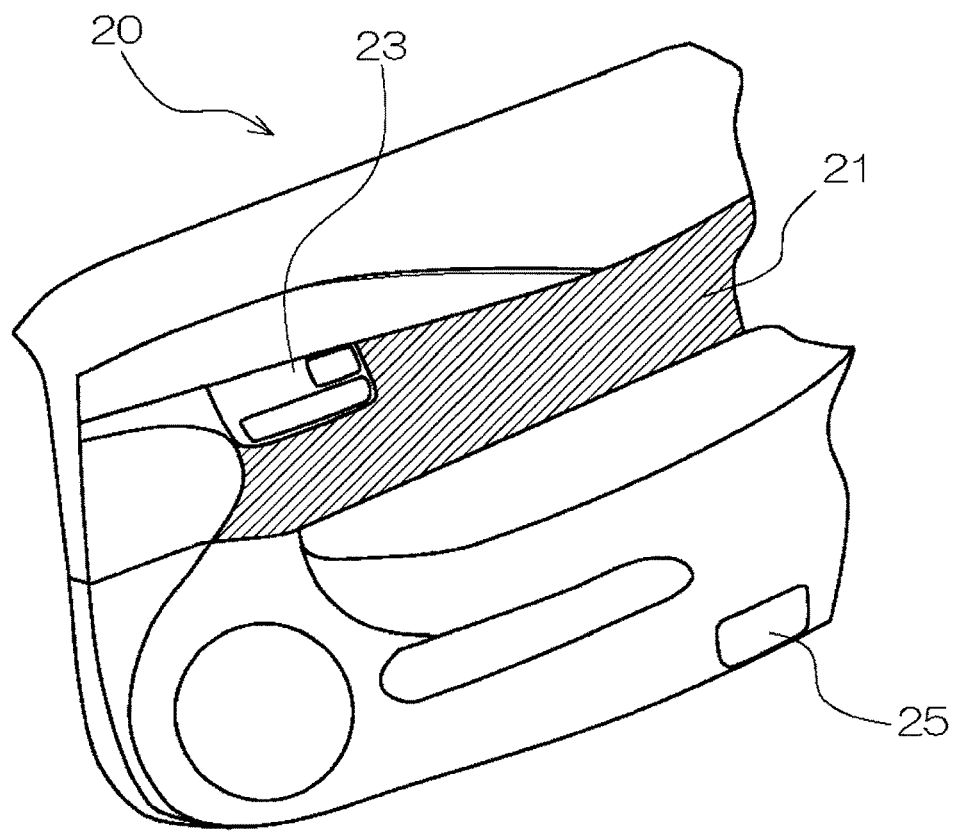
FIG. 6 is a schematic diagram when an illumination apparatus of Example 1 is applied to a door trim.

In a door trim 20 in FIG. 6, the woven fabric 5 in the illumination apparatus 1 of Example 1 (see FIG. 1) is disposed as a skin material for a door ornament 21, and two end part supports 15*a*, 15*b* (see FIG. 4) are disposed as light sources (light emission parts) of an inside handle lamp 23 and a courtesy lamp 25, respectively.

Incidentally, the light source 7, exposed parts 17 on one end side and exposed parts 11 on the other end side (see FIG. 1) in the illumination apparatus 1 of Example 1 are not shown.

(2-2) Action and Effect of Illumination Apparatus Applied to Door Trim

According to Example 2, light delivered from one light source 7 (see FIG. 1) is emitted from the end surfaces of the optical fibers supported by the two end part supports 15*a*, 15*b* (see FIG. 4), thereby making it possible to emit light from the inside handle lamp 23 and courtesy lamp 25, respectively. Therefore, it is possible to reduce the number of the light sources which have been required for the inside handle lamp and courtesy lamp, respectively, in conventional door trims, leading to space saving and cost reduction, and it is also possible to further improve the freedom in design and designability.

Additionally, light can be emitted also from the surface of the skin material for the door ornament 21, thereby further improving the designability and dressing effect.

Example 3

As Example 3, there will be described an example in which the illumination apparatus 1 of Example 1 described above [note that this illumination apparatus 1 includes three end part supports 15 (see FIG. 5)] is applied to a roof trim for automobiles (see FIG. 7).

(3-1) Configuration of Roof Trim

Figure 7:
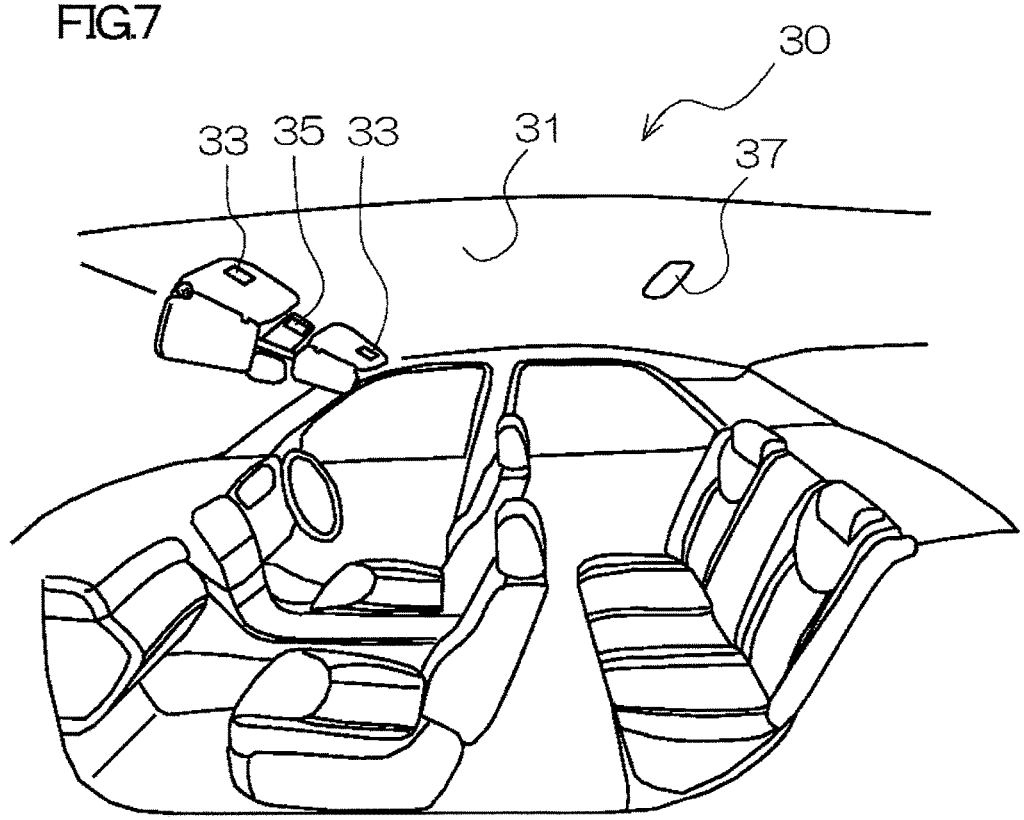
FIG. 7 is a schematic diagram when the illumination apparatus of Example 1 is applied to a roof trim.

In a roof trim 30 in FIG. 7, the woven fabric 5 in the illumination apparatus 1 of Example 1 (see FIG. 1) is disposed as a ceiling skin material 31, and three end part supports 15*a*, 15*b*, 15*c* (see FIG. 5) are disposed as light sources (light emission parts) of a front vanity lamp 33, a front map lamp 35 and a rear lamp 37, respectively.

Incidentally, the light source 7, exposed parts 17 on one end side and exposed parts 11 on the other end side (see FIG. 1) in the illumination apparatus 1 of Example 1 are not shown.

(3-2) Action and Effect of Illumination Apparatus in Roof Trim

According to Example 3, light delivered from one light source 7 (see FIG. 1) is emitted from the end surfaces of the optical fibers supported by the three end part supports 15*a*. 15*b*, 15*c* (see FIG. 5), thereby making it possible to emit light from the front vanity lamp 33, front map lamp 35 and rear lamp 37, respectively. Therefore, it is possible to reduce the number of the light sources which have been required for the front vanity lamp, front map lamp and rear lamp in conventional roof trims, leading to space saving and cost reduction, and it is also possible to further improve the freedom in design and designability.

Additionally, light can be emitted also from the surface of the ceiling skin material 31, thereby further improving the designability and dressing effect.

Example 4

As Example 4, there will be described an example in which the illumination apparatus 1 of Example 1 described above is applied to furniture (sofa) (see FIG. 8).

(4-1) Configuration of Sofa

Figure 8:
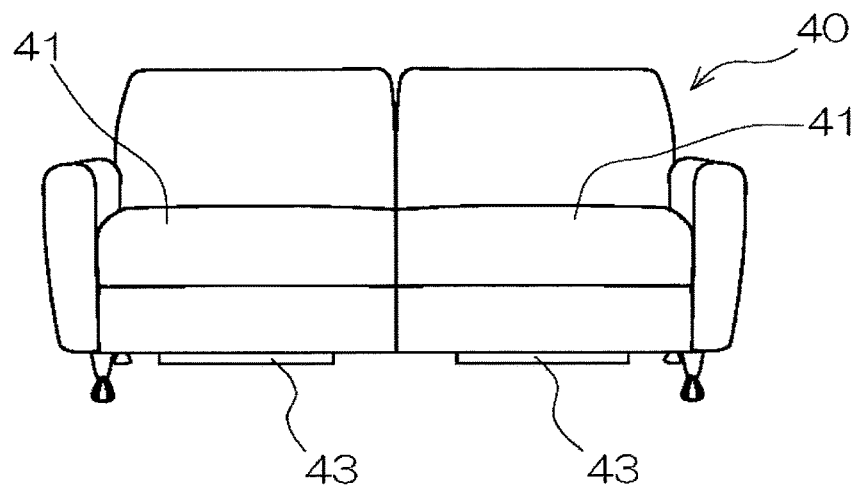
FIG. 8 is a schematic diagram when the illumination apparatus of Example 1 is applied to a sofa.

In a sofa 40 shown in FIG. 8, the woven fabric 5 in the illumination apparatus 1 of Example 1 (see FIG. 1) is disposed as a skin material 41, and the end part support 15 (see FIG. 1) is disposed as a light source (light emission parts) of foot lights 43 formed in the lower part of the sofa 40.

Incidentally, the light source 7, exposed parts 17 on one end side and exposed parts 11 on the other end side (see FIG. 1) in the illumination apparatus 1 of Example 1 are not shown.

(4-2) Action and Effect of Illumination Apparatus in Sofa

According to Example 4, it is possible to emit light delivered from the light source 7 (see FIG. 1) from the end surfaces of the optical fibers supported by the end part support 15 (see FIG. 1), thereby illuminating the lower part of the sofa 40. Therefore, the designability and dressing effect can further be improved.

Additionally, light can be emitted also from the surface of the skin material 41, thereby further improving the designability and dressing effect.

The present invention is not limited to the above-described Examples, and the Examples can be variously changed within the scope of the present invention according to the purpose and application. For example, Example 1 given above has illustrated an example in which side-emitting optical fibers are used as the optical fibers. However, the present invention is not limited to this example, and edge-emitting optical fibers which do not emit light from their circumferential surfaces can be used.

Also, Example 1 given above has illustrated an example in which polyester filaments are used as constituent yarns (other constituent yarns) for the woven fabric. However, the present invention is not limited to this example, and those made of other materials can be used.

Further, Example 1 given above has illustrated an example in which only one light source is used. However, the present invention is not limited to this example, and a plurality of light sources can be used.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the embodiment described in detail above, and can be variously modified or changed within the scope defined in the claims of the present application.

The present invention enables illumination of a site which is distance from the light source via the woven fabric and light emission also from the surface of the woven fabric which serves as a skin, and thus can be utilized in the technical fields of skin materials and illumination apparatuses used in various applications. Especially, the present invention is useful in the technical fields of, for example, skin materials for vehicle interior materials such as door trims and roof trims and skin materials for furniture such as sofas.

What is claimed is:

1. An illumination apparatus comprising a woven fabric in which optical fibers are woven as a constituent yarn and a light source, the illumination apparatus making light delivered from the light source incident upon end surfaces on one end side of the optical fibers and emitting the light at least from end surfaces on an other end side of the optical fibers for illumination,
wherein the other end side of the optical fibers is exposed from the woven fabric to define exposed parts on the other end side;
wherein the end parts of the plurality of the exposed parts on the other end side are supported by at least one end part support to form emitting parts which emit light delivered from the light source;
wherein, on the end part support, the end parts of the plurality of the exposed parts on the other end side are individually supported in a state where their respective end surfaces are aligned on the same plane, and wherein
the at least one end part support is separate from the woven fabric.

2. The illumination apparatus according to claim 1, wherein
side-emitting optical fibers are used as the optical fibers.

3. The illumination apparatus according to claim 1, wherein
the at least one end part support comprises a plurality of end part supports each supporting allocated ones of the end parts of the plurality of the exposed parts on the other end side.

4. The illumination apparatus according to claim 1, wherein
a plurality of groove parts are formed, along the length direction of the optical fibers, in the at least one end part support, and the end parts of the exposed parts on the other end side are engaged with and supported by the plurality of groove parts.

5. The illumination apparatus according to claim 2, wherein
the at least one end part support comprises a plurality of end part supports each supporting allocated ones of the end parts of the plurality of the exposed parts on the other end side.

6. The illumination apparatus according to claim 2, wherein
a plurality of groove parts are formed, along the length direction of the optical fibers, in the at least one end part support, and the end parts of the exposed parts on the other end side are engaged with and supported by the plurality of groove parts.

7. The illumination apparatus according to 3, wherein
a plurality of groove parts are formed, along the length direction of the optical fibers, in the at least one end part support, and the end parts of the exposed parts on the other end side are engaged with and supported by the plurality of groove parts.

8. The illumination apparatus according to claim 5, wherein
a plurality of groove parts are formed, along the length direction of the optical fibers, in the at least one end part support, and the end parts of the exposed parts on the other end side are engaged with and supported by the plurality of groove parts.

9. The illumination apparatus according to claim 1, wherein the exposed parts on the other end side extend from the woven fabric such that the emitting parts are configured to be freely arranged around the woven fabric.

10. The illumination apparatus according to claim 2, wherein the exposed parts on the other end side extend from the woven fabric such that the emitting parts are configured to be freely arranged around the woven fabric.

11. The illumination apparatus according to claim 3, wherein the exposed parts on the other end side extend from the woven fabric such that the emitting parts are configured to be freely arranged around the woven fabric.

12. The illumination apparatus according to claim 4, wherein the exposed parts on the other end side extend from the woven fabric such that the emitting parts are configured to be freely arranged around the woven fabric.

13. The illumination apparatus according to claim 1, wherein the exposed parts have an un-supported intermediate portion defined between an outer side edge of the woven fabric and a side edge of the at least one end part support that is nearest the one support.

14. The illumination apparatus according to claim 2, wherein the exposed parts have an un-supported intermediate portion defined between an outer side edge of the woven fabric and a side edge of the at least one end part support that is nearest the one support.

15. The illumination apparatus according to claim 3, wherein the exposed parts have an un-supported intermediate portion defined between an outer side edge of the woven fabric and a side edge of the at least one end part support that is nearest the one support.

16. The illumination apparatus according to claim 4, wherein the exposed parts have an un-supported intermediate portion defined between an outer side edge of the woven fabric and a side edge of the at least one end part support that is nearest the one support.

17. The illumination apparatus according to claim 4, wherein the plurality of groove parts are defined by a plurality of linear channels extending in a longitudinal direction of the optical fibers and receiving the end parts of the plurality of the exposed parts.

18. The illumination apparatus according to claim 6, wherein the plurality of groove parts are defined by a plurality of linear channels extending in a longitudinal direction of the optical fibers and receiving the end parts of the plurality of the exposed parts.

19. The illumination apparatus according to claim 7, wherein the plurality of groove parts are defined by a plurality of linear channels extending in a longitudinal direction of the optical fibers and receiving the end parts of the plurality of the exposed parts.

20. The illumination apparatus according to claim 8, wherein the plurality of groove parts are defined by a plurality of linear channels extending in a longitudinal direction of the optical fibers and receiving the end parts of the plurality of the exposed parts.

\* \* \* \* \*